United States Patent [19]

Taylor

[11] 4,240,547

[45] Dec. 23, 1980

[54] SPECIMEN MAILER

[76] Inventor: Billy W. Taylor, 410 Raymondale, Apt. #3, South Pasadena, Calif. 91100

[21] Appl. No.: 963,931

[22] Filed: Nov. 27, 1978

[51] Int. Cl.³ .................. B65D 77/22; B65D 81/16; B65D 85/42
[52] U.S. Cl. ............................ 206/204; 206/443; 206/456; 206/523; 206/538; 206/569; 206/589; 220/4 E
[58] Field of Search ............... 206/194, 196, 203–204, 206/232, 418–420, 433, 443, 459, 485–486, 521, 523, 526, 538–539, 569, 588–589, 591–592, 594; 211/29, 60 R, 74; 217/35; 220/4 B, 4 E

[56] References Cited

U.S. PATENT DOCUMENTS

| | | | |
|---|---|---|---|
| 3,200,943 | 8/1965 | Waterbury | 206/523 |
| 3,406,856 | 10/1968 | Griffith et al. | 220/4 E |
| 3,446,342 | 5/1969 | Michel | 206/459 |
| 3,621,994 | 11/1971 | Brown | 206/523 X |
| 3,695,503 | 10/1972 | Mascetti, Jr. | 220/4 E X |

FOREIGN PATENT DOCUMENTS

479455  11/1969  Switzerland ............................ 206/433

OTHER PUBLICATIONS

Catalogue of the Polyfoam Packers Corp., Chicago, Ill. (p. 8).

Primary Examiner—Stephen Marcus
Attorney, Agent, or Firm—Chernoff & Vilhauer

[57] ABSTRACT

A compact, reusable specimen mailer for safely shipping fragile specimen containers via the postal service. Two substantially identical L-shaped matable parts are each provided with a long leg having a flat free end and a flat inside face, and a short leg having a flat inside face, so that the two parts may be joined together with the free end of the long leg flush against the inside face of the short leg and the inside faces of the long legs of the two parts flush against each other. Typically, the long leg of each part forms apertures for receiving test tubes and the inside face of the short leg of each part forms a cavity for receiving the ends of the test tubes, which protrude from the free end of the long leg of the other part. Also typically, the long leg forms an aperture opening out of its free end and its inside face, and connected with another cavity formed in the inside face of the short leg, for receiving a slide holder. A sheet of absorbent material is disposed within a recess in the inside face of the long leg for absorbing leaking fluids. The two parts are joined together and placed in a special envelope for mailing.

7 Claims, 5 Drawing Figures

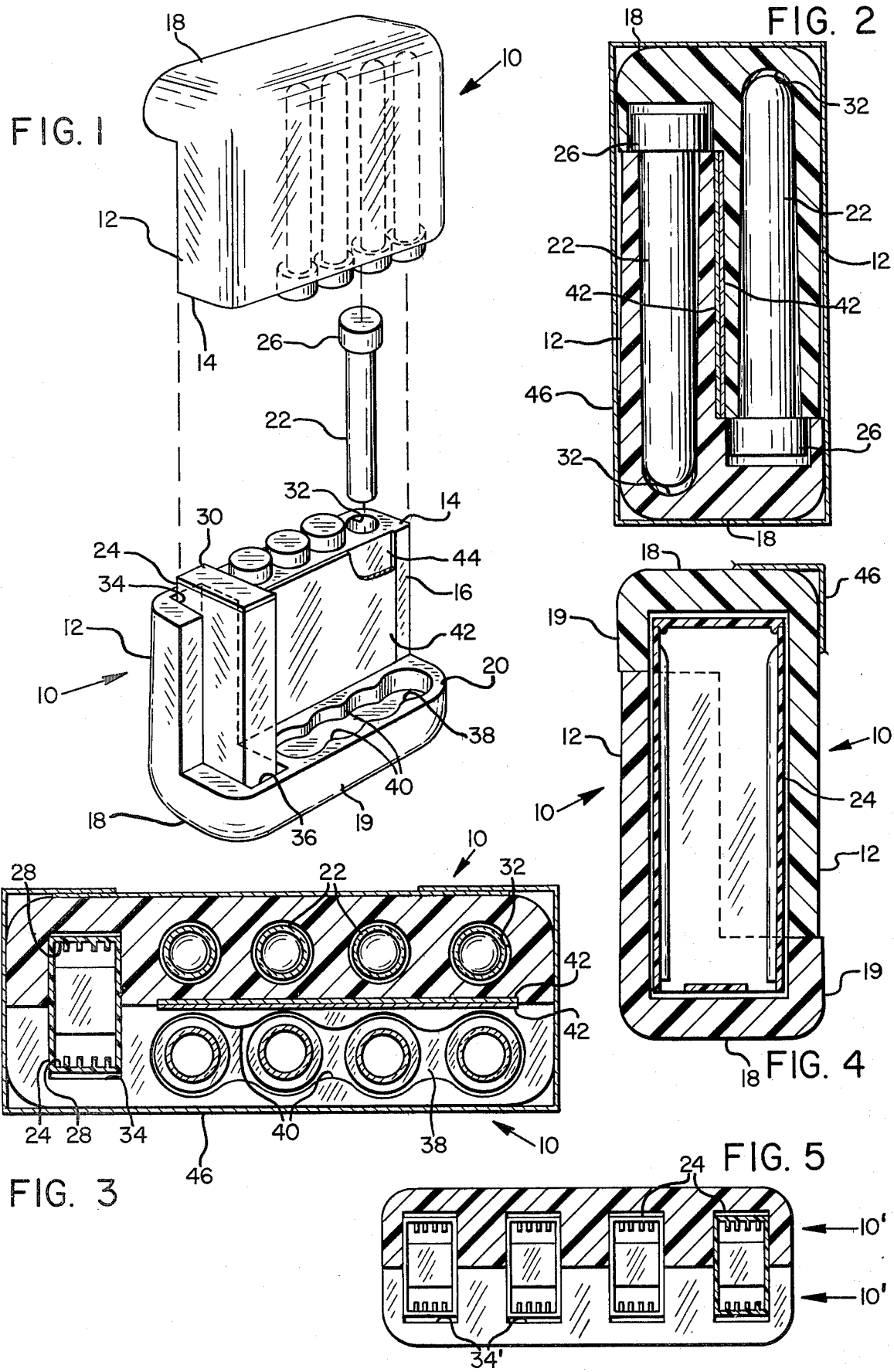
U.S. Patent   Dec. 23, 1980   4,240,547

SPECIMEN MAILER

BACKGROUND OF THE INVENTION

This invention relates to shipping packages, in particular, packages, or "specimen mailers", for shipping biological and chemical specimens via the postal service.

In the medical and chemical arts it is frequently necessary to ship biological and chemical specimens from one point to another via the postal service, for example when a specimen is sent to a medical laboratory for testing and analysis. Typically, such specimens comprise fluid placed in glass test tubes and on glass slides which must be protected from shock during handling, due to the fragile nature of the test tubes and slides, in order to prevent breakage. At the same time, it is desirable to prevent the specimens from contaminating or damaging other mail, or other specimens, in the event that leakage occurs. Accordingly, such specimens are ordinarily placed in a protective, shock-resistant package, or "specimen mailer", typically made of polystyrene plastic foam, such as that sold by Dow Chemical Co. of Midland, Mich. under the trademark STYROFOAM, and designed to hold a plurality of such specimens.

One type of known specimen mailer, for example that disclosed in U.S. Pat. No. 3,446,342, utilizes an elongate block of polystyrene plastic foam in the form of a rectangular prism with a row of in-line apertures formed therein for receiving specimen containers. The containers, which typically comprise as many as eight elongate test tubes with caps and at least one elongate box for holding specimen slides, are enclosed by the block except for their capped ends and are held within the block by friction force produced as a result of making the apertures slightly undersized for the specimen containers. In addition, ridges are ordinarily formed in the plastic foam along two sides of the row of protruding containers to protect the protruding ends from damage, and once the containers are inserted the block is placed within a paper envelope for protection and to provide a place for mailing instructions and postage.

Another type of known specimen mailer, for example a Model 341 specimen mailer sold by Polyfoam Packers Corp. of Chicago, Illinois, comprises a thin rectangular prismatic block of plastic foam formed from two interlocking symmetrical parts which divide the block in half along its thin dimensions. Inside the block, each part contains a row of in-line recesses for receiving and partially enclosing specimen test tubes and slides, which are fully enclosed by both parts of the block when the two parts are placed together. Such a container is also typically placed in a paper mailing envelope.

While the afore-described types of prior art specimen mailers provide some protection for specimen containers shipped therein, there is a need for an improved specimen mailer which makes more efficient use of space to reduce its size and weight, thereby reducing manufacturing and mailing costs, which better facilitates insertion and removal of specimen containers, and which prevents contamination of other mail and specimens from specimen-container leakage. In addition, it would be desirable for such a mailer to provide greater protection against shock to the specimen and be readily adaptable for reuse.

SUMMARY OF THE INVENTION

The present invention achieves the aforementioned objectives by providing a two-piece, symmetrical, reusable package which is relatively compact and lightweight, completely encloses the specimen containers by a shock absorbent material, enables the specimen containers to be inserted and removed readily, and provides for the inclusion of a material to absorb leaking specimen fluid which might otherwise contaminate other mail or specimens. As a result, the specimen mailer of the present invention is relatively inexpensive to manufacture and to mail, convenient to use and less likely to cause damage to other mail than prior art mailers.

The specimen mailer of this invention comprises two L-shaped symmetrical parts which fit together to form a rectangular, prismatic block which is relatively small and light-weight for a given number of specimen containers, and is insertable within a conventional paper mailing envelope which covers the two parts. Each part has a plurality of apertures formed in the long leg of the L, extending from an opening in the free end of the long leg toward the short leg of the L for receiving test tube specimen containers. In addition, an aperture which is open both at the free end of the long leg of the L and along the inside face of that leg is formed therein and terminates in a cavity formed in the inside face of the short leg of the L for receiving a slide holder. The capped ends of the test tubes protrude out of the free end of the long leg, and the slide holder may protrude both out of the free end and out of the inside face of the long leg. To accommodate the ends of the test tubes, the inside face of the short leg includes an additional cavity into which the capped ends of the test tubes are inserted when the two L-shaped parts are matingly joined. Thus, for example, a typical mailer would be made of two identical L-shaped parts, each having four apertures for receiving test tubes and one aperture for receiving a slide holder. When the two parts are placed together the slide holder would be covered identically by both parts, and the capped ends of the four test tubes placed in the long leg of each part would be inserted in the cavity of the short leg and covered thereby, forming a completely enclosed package holding eight test tubes and a slide holder.

In order to prevent relative lateral movement of the two parts, in the event that fewer than the maximum number of test tubes and no slide holder are placed in a mailer, the cavity within the face of the short leg is provided with a plurality of inward protuberances which partially surround the cap area of each test tube.

The inside face of the long leg of each part is provided with a large rectangular recess in which a sheet of a replaceable absorbent material is placed to absorb fluids which leak from the specimen containers. Due to the geometry of the L-shaped parts the absorbent material may be made with a large area placed equally close to the cap of each test tube, thereby greatly increasing the probability of absorbing any fluid from the specimens.

Accordingly, it is a principal objective of the present invention to provide a new and improved specimen mailer for shipping chemical and biological specimens via the postal service.

It is another principal objective of the present invention to provide such a mailer that is relatively more compact, lightweight and easy to manufacture.

It is a further objective of the present invention to provide such a specimen mailer which better protects the specimens being shipped and prevents contamination or damage to other mail by leaking specimens.

It is yet another objective of the present invention to provide such a specimen mailer which is more convenient to use.

It is a principal feature of the specimen mailer of the present invention that it utilizes a pair of L-shaped symmetrical, matable parts which fully enclose specimen containers therein.

It is yet another feature of the present invention that the mailer contains an absorbent material having a large surface area placed in close proximity to all of the specimen containers for absorbing fluids in the event of leakage.

It is a further feature that test tube specimen containers may be placed end first into apertures within the mailer leaving their capped ends protruding for easy removal thereof.

It is yet a further feature that the specimen mailer can be constructed to hold several different combinations of either test tube specimen containers or slide holder specimen containers.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is an exploded view of an exemplary specimen mailer according to the present invention in a configuration for shipping eight test tubes and one slide holder.

FIG. 2 is a vertical side section of the specimen mailer of FIG. 1 taken through two test tube apertures thereof.

FIG. 3 is a horizontal top section of the specimen mailer of FIG. 1 taken along the inside face of a short leg thereof.

FIG. 4 is a vertical section of the specimen mailer of FIG. 1 taken through a slide holder aperture thereof.

FIG. 5 is a horizontal top section of another exemplary embodiment of a specimen mailer containing four slide holders and no test tubes.

DETAILED DESCRIPTION OF THE INVENTION

Referring first to FiG. 1 of the drawings, the specimen mailer of the present invention comprises two substantially identical, L-shaped matable parts 10, each part having a long leg 12 with a free end 14 and an inside face 16, and a short leg 18 perpendicular thereto with a free end 19 and an inside face 20. The free end 14 and the inside face 16 of the long leg and the inside face 20 of the short leg are all substantially flat so that when the two parts 10 are matably placed together the free end 14 of the long leg of one part will fit flushly against the inside face 20 of the short leg of the other part, and the respective inside faces 16 of the long legs of both parts will fit flushly against one another, resulting in a substantially rectangular prismatic package the interior of which is fully enclosed. These parts are preferably made of polystyrene plastic foam, such as the previously-mentioned product sold under the trademark STYROFOAM, for protection from shock and for good thermal insulation. For ease of manipulation the outside corners of the package are rounded, thereby permitting ease of insertion of the package into an envelope and reducing the amount of material necessary to make the two parts.

In the preferred embodiment, shown in FIGS. 1-4, the mailer is designed to accept one or more test tube specimen containers 22 and one or more slide holder specimen containers 24, designed to contain a plurality of glass specimen slides (not shown) therein. A test tube 22 for use in the mailer typically is made of glass and is adapted to receive a threaded or pressure-fit cap 26 on its open end. A slide holder 24 ordinarily has the shape of a rectangular prism, is typically made of plastic, has slots 28 inside for receiving flat, rectangular glass slides, and has a cap 30 on one end thereof for holding the slides inside. Typically a specimen mailer would be constructed to accept four test tubes 22 and one slide holder 24.

Each part 10 of a specimen mailer designed to accept test tubes is provided with one or more elongate test tube apertures 32 running from an opening in the free end 14 of the long leg toward the short leg in a direction perpendicular to the inside face 20 thereof. Thus, as particularly shown in FIG. 2, a test tube inserted within a test tube aperture 32 extends through the long leg to the area of the part where the long and short legs are joined and is fully enclosed by the part, except for its protruding, capped end.

The short leg of each part forms at least one test tube cavity 38 for receiving the ends of test tubes protruding from the free end of a long leg of the other part. Preferably the test tube cavity also includes a plurality of inwardly directed protuberances 40 which wrap partially around the caps of the test tubes so that if no slide holder and fewer than the maximum number of test tubes are included in the mailer relative longitudinal movement of the two parts 10 in a direction perpendicular to the test tubes will nevertheless be prevented. Thus, when the two parts 10 are placed matingly together, most of the length of each test tube is completely surrounded by one part 10 while the remaining portion, that is, the capped portion, is surrounded by the other part.

Similarly, the long leg defines an elongate, rectangular slide holder aperture 34 which opens both out of the free end 14 and the inside face 16 of the long leg. Also, the short leg is provided with a corresponding slide holder cavity 36 into which the slide holder aperture 34 of the long leg opens so that a slide holder 24 will fit into the slide holder aperture and slide holder cavity simultaneously, as shwon in FIG. 1. Thus, when the two parts 10 are placed matingly together, the slide holder may fit into the aperture 34 and the cavity 36 of each part and is completely surrounded and protected by the two parts.

In order to prevent fluids which may leak out of the specimen containers from damaging or contaminating other mail or other specimens, each part 10 of the mailer is provided with an absorbent material 42 preferably placed within a recess 44 in the inside face of each long leg 12. This permits the absorbent material to be made with a relatively large, flat surface area and to be placed in close proximity to the openings of each of the test tube cavities, that is, where leakage is most likely to occur due either to a broken test tube or a leaky cap. The large surface area tends to prevent leaking fluid from escaping absorption by flowing across the absorbent material because of the distance it would be required to flow. The absorbent material 42 is preferably attached to the inside face 16 of a part by a releasable adhesive of any common type, for example, a double-sided plastic tape, so that for reuse of a specimen mailer the absorbent material 42 can readily be replaced; thus, it not only tends to prevent contamination and damage of other mail by absorbing fluid before it can leak outside the mailer package, but it also tends to prevent permanent damage to the specimen mailer itself.

Although the preferred embodiment includes apertures for one or more test tubes as well as for one or more slide holders, the mailer could be made either for receiving test tubes alone or for slide holders alone. For example, in the exemplary embodiment shown in FIG. 5 (also having a cross section as shown in FIG. 4) each part 10' would be provided with several specimen holder apertures 34' in its long leg and several corresponding specimen holder cavities, such as those designated by the number 36 in FIG. 1, in its short leg. Although this leaves little room on the inside faces of the long legs for placement of absorbent material, the need for such material does not exist without test tubes full of fluid. Moreover, to the extent that apertures for test tubes are provided, space would be available on the inside faces of the long legs for placement of a sheet of absorbent material.

In use, a typical mailer would be filled with test tubes containing biological samples, for example blood samples, and a slide holder carrying a plurality of slides for use in a microscope, to be sent to a medical laboratory for testing and analysis. A fresh sheet of absorbent material 42 would be placed into the recess of each part and the two parts would be placed together so as fully to surround the specimen containers by a plastic foam cushion. Thereafter the mated parts would be placed in a specially-designed paper envelope 46 upon which the mailing address and postage is placed, and the package would be mailed to the laboratory.

The terms and expressions which have been employed in the foregoing abstract and specification are used therein as terms of description and not of limitation, and there is no intention of the use of such terms and expressions of excluding equivalents of the features shown and described or portions thereof, it being recognized that the scope of the invention is defined and limited only by the claims which follow.

What I claim is:

1. A reusable package for safely shipping fragile, elongate specimen containers, said package comprising: two L-shaped, matable parts of substantially identical size and shape, each said part having a long leg with a free end and an inside face, and a short leg with a free end and an inside face; the long leg and the short leg of each said part being joined together perpendicularly at ends thereof opposite said respective free ends, the long leg including means defining an elongate, laterally-enclosed aperture therein extending from an opening of said aperture in the free end of said long leg toward the corresponding short leg thereof for receiving a specimen container; the short leg of each said part including means defining a cavity therein and an opening of said cavity in the inside face of said short leg for receiving an end of a specimen container; the inside face of the short leg of one part being disposed adjacent the free end of the long leg of the other part and the end opening of the elongate, laterally-enclosed aperture in said other part opening into the opening of the cavity in said one part when said two parts are mated, such that a specimen container disposed within said elongate laterally-enclosed aperture of either part is completely enclosed by said package.

2. A reusable package for safely shipping fragile, elongate specimen containers, said package comprising: two L-shaped, matable parts of substantially identical size, each said part having a long leg with a free end and an inside face, and a short leg with a free end and an inside face; the long leg and the short leg of each said part being joined together perpendicularly at ends thereof opposite said respective free ends; the long leg including means defining a plurality of holes therein extending from respective openings of said holes in the free end of said long leg through the long leg toward the corresponding short leg thereof for receiving specimen containers; the short leg of each said part including means defining a cavity therein and an opening of said cavity in the inside face of said short leg for receiving an end of a specimen container, the inside face of the short leg of one part being disposed adjacent the free end of the long leg of the other part and the end openings of the holes in said other part opening into the opening of the cavity in said one part when said two parts are mated, such that a specimen container disposed within any of said holes of either part is completely enclosed by said package.

3. The package of claim 2 wherein the cavity opening of each said part is elongate in shape and each of said plurality of holes opens into said elongate cavity when said two parts are mated, said cavity having a plurality of inward protuberances dividing said cavity into a plurality of spaces corresponding in number and position to the respective openings of said holes.

4. A reusable package for safely shipping fragile, elongate specimen containers, said package comprising: two L-shaped, matable parts of substantially identical size, each said part having a long leg with a free end and an inside face, and a short leg with a free end and an inside face; the long leg and the short leg of each said part being joined together perpendicularly at ends thereof opposite said respective free ends; the long leg including means defining a hole therein extending from an opening of said hole in the free end of said long leg toward the corresponding short leg thereof for receiving a specimen container; the short leg of each said part including means defining a cavity therein and an opening of said cavity in the inside face of said short leg for receiving an end of a specimen container; the inside face of the short leg of one part being disposed adjacent the free end of the long leg of the other part and the end opening of the hole in said other part opening into the opening of the cavity in said one part when said two parts are mated, such that a specimen container disposed within said hole of either part is completely enclosed by said package, each said part further having a flat recess disposed within the inside face of its long leg for receiving a substantially flat sheet of absorbent material.

5. A reusable package for safely shipping fragile, elongate specimen containers, said package comprising: two L-shaped, matable parts of substantially identical size, each said part having a long leg with a free end and an inside face, and a short leg with a free end and an inside face; the long leg and the short leg of each said part being joined together perpendicularly at ends thereof opposite said respective free ends; the long leg including means defining a plurality of elongate apertures therein extending from respective openings of said apertures in the free end of said long leg toward the corresponding short leg thereof for receiving a specimen container, and means defining openings of each said elongate aperture along its longitudinal dimension out of said inside face of said long leg; the short leg of each part including means defining a plurality of cavities therein and respective openings of each said cavity in the inside face of said short leg for receiving ends of specimen containers, each said cavity of the short leg and a respective aperture of its corresponding long leg opening into one another where the two legs are connected; the inside face of the short leg of one part being disposed adjacent the free end of the long leg of the other part and the end openings of the elongate apertures in said other part opening into respective openings of the cavities in said one part when said two parts are mated, such that specimen containers disposed within said elongate apertures of either part are completely enclosed by said package.

6. A reusable package for safely shipping fragile, elongate specimen containers, said package comprising: two L-shaped, matable parts of substantially identical size, each said part having a long leg with a free end and an inside face, and a short leg with a free end and an inside face; the long leg and the short leg of each said part being joined perpendicularly at ends thereof opposite said respective free ends; the long leg including means defining an elongate hole extending from an opening in the free end of the long leg through the long leg toward the corresponding short leg thereof, and means defining an elongate aperture extending longitudinally through the long leg from an opening in its free end toward the corresponding short leg and defining an opening of said aperture out of the inside face of the long leg, for receiving specimen containers; the short leg of each said part including means defining a first cavity therein, corresponding in position to the opening of said hole in the other of said two parts when they are mated, and an opening of said first cavity in the inside face of said short leg, and means defining a second cavity therein and openings of said second cavity in the inside face of said short leg and into said second elongate aperture of said long leg, for receiving respective ends of specimen containers; the inside face of the short leg of one part being disposed adjacent the free end of the long leg of the other part, and the end openings of the hole and elongate aperture in said other part opening into the openings of said first and second cavities, respectively, in said one part when said two parts are mated, such that a specimen container disclosed within said hole or elongate aperture of either part is completely enclosed by said package.

7. The package of claim 6 further comprising means defining a flat recess in the inside face of the long leg of each part for receiving a substantially flat sheet of absorbent material.

* * * * *

UNITED STATES PATENT AND TRADEMARK OFFICE
CERTIFICATE OF CORRECTION

PATENT NO. : 4,240,547
DATED : December 23, 1980
INVENTOR(S) : Billy W. Taylor

It is certified that error appears in the above-identified patent and that said Letters Patent are hereby corrected as shown below:

Col. 4, Line 49  Change "shwon" to --shown--.

Col. 7, Line 25  After "joined" insert --together--.

Signed and Sealed this

Fifth Day of January 1982

[SEAL]

Attest:

Attesting Officer

GERALD J. MOSSINGHOFF

Commissioner of Patents and Trademarks